US012573153B2

(12) United States Patent
Watson et al.

(10) Patent No.: US 12,573,153 B2
(45) Date of Patent: *Mar. 10, 2026

(54) DETERMINING TRAVERSABLE SPACE FROM SINGLE IMAGES

(71) Applicant: Niantic Spatial, Inc., San Francisco, CA (US)

(72) Inventors: James Watson, London (GB); Michael David Firman, London (GB); Aaron Monszpart, London (GB); Gabriel J. Brostow, London (GB)

(73) Assignee: Niantic Spatial, Inc., San Francisco, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 18/218,465

(22) Filed: Jul. 5, 2023

(65) Prior Publication Data

US 2023/0360339 A1 Nov. 9, 2023

Related U.S. Application Data

(63) Continuation of application No. 17/193,878, filed on Mar. 5, 2021, now Pat. No. 11,741,675.

(Continued)

(51) Int. Cl.
*G06T 19/00* (2011.01)
*G06N 20/00* (2019.01)
(Continued)

(52) U.S. Cl.
CPC .......... *G06T 19/006* (2013.01); *G06N 20/00* (2019.01); *G06T 7/10* (2017.01); *G06T 7/50* (2017.01);
(Continued)

(58) Field of Classification Search
CPC .......... G06T 19/006; G06T 7/10; G06T 7/50; G06T 19/20; G06T 2207/20081;
(Continued)

(56) References Cited

U.S. PATENT DOCUMENTS 8,855,408 B2 10/2014 Kim et al.
10,977,662 B2 4/2021 Shaw
(Continued)

FOREIGN PATENT DOCUMENTS

CA 3100640 A1 11/2019
CN 107407567 A 11/2017
(Continued)

OTHER PUBLICATIONS

PCT International Search Report and Written Opinion, PCT Application No. PCT/IB2021/051947, Jun. 16, 2021, nine pages.
(Continued)

*Primary Examiner* — Duy M Dang
(74) *Attorney, Agent, or Firm* — Fenwick & West LLP

(57) ABSTRACT

A model predicts the geometry of both visible and occluded traversable surfaces from input images. The model may be trained from stereo video sequences, using camera poses, per-frame depth, and semantic segmentation to form training data, which is used to supervise an image to image network. In various embodiments, the model is applied to a single RGB image depicting a scene to produce information describing traversable space of the scene that includes occluded traversable. The information describing traversable space can include a segmentation mask of traversable space (both visible and occluded) and non-traversable space and a depth map indicating an estimated depth to traversable surfaces corresponding to each pixel determined to correspond to traversable space.

21 Claims, 7 Drawing Sheets

Related U.S. Application Data

(60) Provisional application No. 62/987,849, filed on Mar. 10, 2020.

(51) Int. Cl.

| | |
|---|---|
| *G06T 7/10* | (2017.01) |
| *G06T 7/50* | (2017.01) |
| *G06T 19/20* | (2011.01) |
| *G06V 10/26* | (2022.01) |
| *G06V 10/774* | (2022.01) |
| *G06V 20/10* | (2022.01) |

(52) U.S. Cl.
CPC .............. *G06T 19/20* (2013.01); *G06V 10/26* (2022.01); *G06V 10/774* (2022.01); *G06V 20/10* (2022.01); *G06T 2207/20081* (2013.01); *G06T 2219/2004* (2013.01)

(58) Field of Classification Search
CPC ... G06T 2219/2004; G06T 7/11; G06T 17/00; G06V 10/26; G06V 10/774; G06V 20/10; G06N 3/084; G06N 20/00; G05D 1/0212; G05D 1/0274; G06F 18/214
See application file for complete search history.

(56) References Cited

U.S. PATENT DOCUMENTS

| | | | |
|---|---|---|---|
| 11,741,675 B2 * | 8/2023 | Watson | G06T 19/20 382/159 |
| 2013/0063556 A1 | 3/2013 | Russell et al. | |
| 2015/0231490 A1 | 8/2015 | Graepel et al. | |
| 2015/0356365 A1 | 12/2015 | Collet et al. | |
| 2019/0057509 A1 | 2/2019 | Lv et al. | |
| 2019/0094875 A1 | 3/2019 | Schulter et al. | |
| 2019/0113349 A1 | 4/2019 | Lavu et al. | |
| 2019/0208181 A1 | 7/2019 | Rowell et al. | |
| 2020/0054939 A1 | 2/2020 | Golden et al. | |
| 2020/0272164 A1 | 8/2020 | Gray | |
| 2020/0334894 A1 | 10/2020 | Long et al. | |
| 2021/0004984 A1 | 1/2021 | Ji et al. | |
| 2021/0073953 A1 | 3/2021 | Lee | |
| 2021/0142497 A1 | 5/2021 | Pugh et al. | |
| 2024/0340400 A1 | 10/2024 | Godard et al. | |

FOREIGN PATENT DOCUMENTS

| | | |
|---|---|---|
| CN | 109215080 A | 1/2019 |
| CN | 110088801 A | 8/2019 |
| CN | 11 0400322 A | 11/2019 |
| JP | 2019-008796 A | 1/2019 |
| JP | 2019-537080 A | 12/2019 |
| KR | 10-2018-0058624 A | 6/2018 |
| KR | 10-2020-0020646 A | 2/2020 |
| WO | 2018/123641 A1 | 7/2018 |

OTHER PUBLICATIONS

Taiwan Intellectual Property Office, Office Action, Taiwanese Patent Application No. 110108388, Mar. 23, 2022, six pages.
United States Office Action, U.S. Appl. No. 17/193,878, filed Dec. 30, 2022, 12 pages.
United States Office Action, U.S. Appl. No. 17/193,878, filed Jun. 15, 2022, 10 pages.
United States Office Action, U.S. Appl. No. 17/193,878, filed Jan. 3, 2022, 10 pages.
United States Office Action, U.S. Appl. No. 17/193,878, filed Sep. 9, 2021, 8 pages.
Echigo T: "Segmentation of a 3D scene into free areas and object surfaces by using occluded edges of trinocular stereo", Intelligent Robots And Systems '91, IEEE, Nov. 3, 1991, pp. 863-868.
Extended European Search Report and Search Opinion received for European Application No. 21768066.9, mailed on Mar. 12, 2024, 11 pages.
Garg, R et al , "Unsupervised cnn for single view depth estimation Geometry to the rescue," European Conference on Computer Vision, Oct. 8, 2016, pp. 740-756.
Gupta, S. et al., "Cognitive Mapping and Planning for Visual Navigation", arxiv.org, vol. 1702.03920, No. v2, Apr. 23, 2017, pp. 1-14.
International Search Report and Written Opinion received for PCT Patent Application No. PCT/IB2021/051947, mailed on Jun. 16, 2021, 7 pages.
Office Action received for Japanese Patent Application No. 2022-554751, mailed on Jan. 7, 2025, 6 pages (3 pages of English Translation and 3 pages of Original Document).
Takemura, I., et al., "Half-DR Expression of a Blind-Spot Area Using Automatic Driving Software", The 23rd Virtual Reality Society of Japan General Conference, Sep. 19, 2018.
Tanaka, K, et al., "Building a floor map by combining stereo vision and visual tracking of persons", Computational Intelligence In Robotics And Automation, 2003, Proceedin Gs. 2003 Ieee International Symposium On Jul. 16-20, 2003, vol. 2, Jul. 16, 2003, pp. 641-646.
Wang, X., et al., "Viewpoint-Predicting-Based Remote Rendering on Mobile Devices Using Multiple Depth Images," 2015 International Conference on Virtual Reality and Visualization (ICVRV) [online], IEEE, 2015, pp. 216-223.
Yingze, B. S. et al., "Understanding the 3D layout of a cluttered room from multiple images", IEEE Winter Conference On Applications Of Computer Vision, IEEE, Mar. 24, 2014, pp. 690-697.
Qing R. et al., "Automatic Human Body Foreground Matting Algorithm," Journal of Computer-Aided Design & Computer Graphics, vol. 32, No. 2, Feb. 2020, pp. 277-286.
Zhenjie, S. et al., "Scene Depth Estimation for Single Digital Image in Multi-scaled Space," Computer Technology and Development, 2013, Issue 1, Jan. 2013, pp. 1-12.
Chinese Intellectual Property Office, Office Action, Chinese Patent Application No. 202180032229.1, Dec. 5, 2025, 14 pages.

* cited by examiner

100

Client Device
110

| Camera Assembly 125 | Traversable Space Estimation Model 130 | Gaming Module 135 | Positioning Module 140 |

Network
105

Game Database
115

Game Server
120

| Universal Game Module 145 | Commercial Game Module 150 | Data Collection Module 155 | Event Module 160 |

Traversable Space Estimation Training System
170

| Stereo Vision Module 175 | Training Image Synthesis Module 180 | Training Loss Module 185 |

| Object Footprint Estimation Module 190 | Movement Estimation Module 195 |

Figure 5:
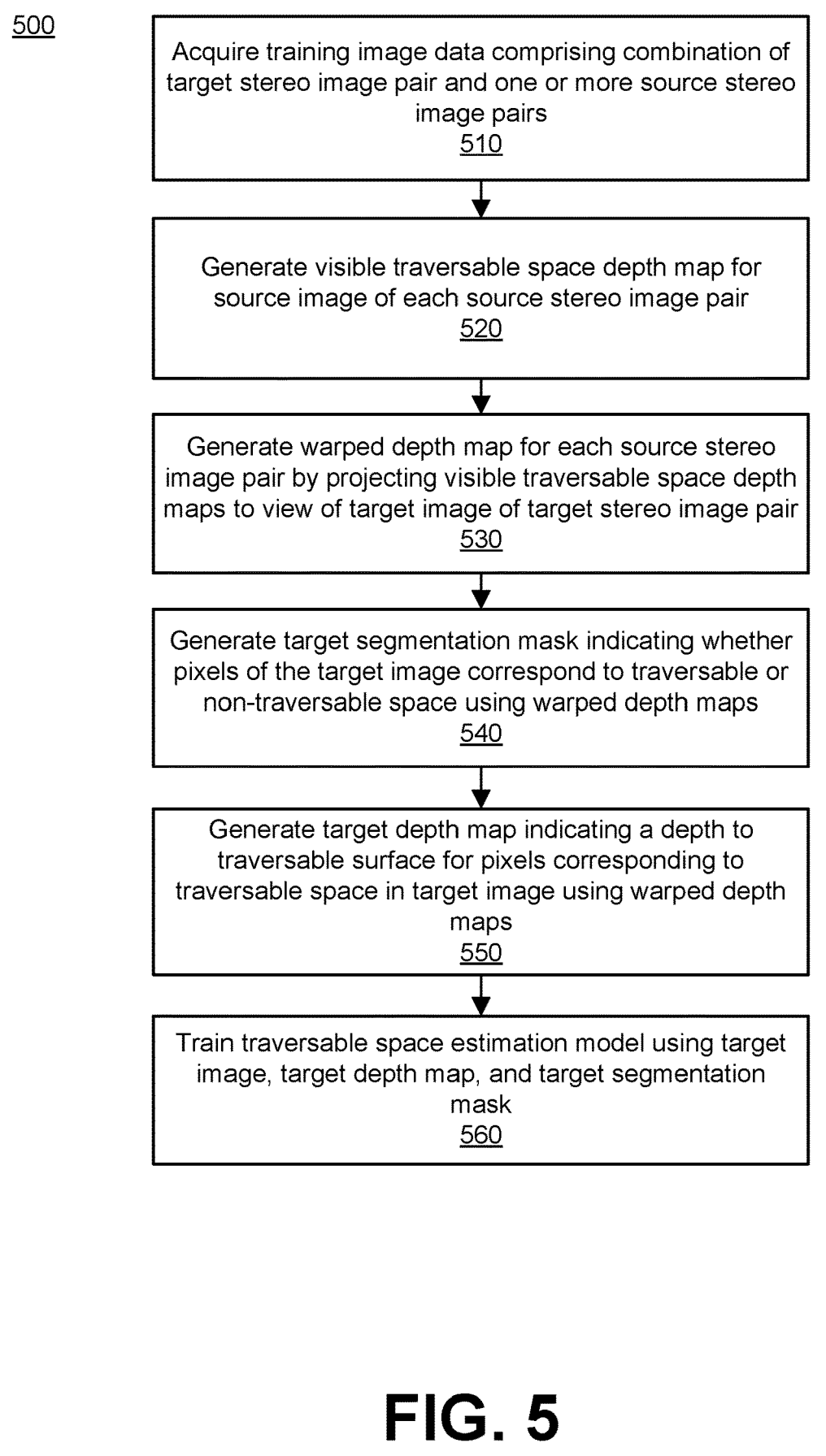

Acquire training image data comprising combination of target stereo image pair and one or more source stereo image pairs
510

Generate visible traversable space depth map for source image of each source stereo image pair
520

Generate warped depth map for each source stereo image pair by projecting visible traversable space depth maps to view of target image of target stereo image pair
530

Generate target segmentation mask indicating whether pixels of the target image correspond to traversable or non-traversable space using warped depth maps
540

Generate target depth map indicating a depth to traversable surface for pixels corresponding to traversable space in target image using warped depth maps
550

Train traversable space estimation model using target image, target depth map, and target segmentation mask
560

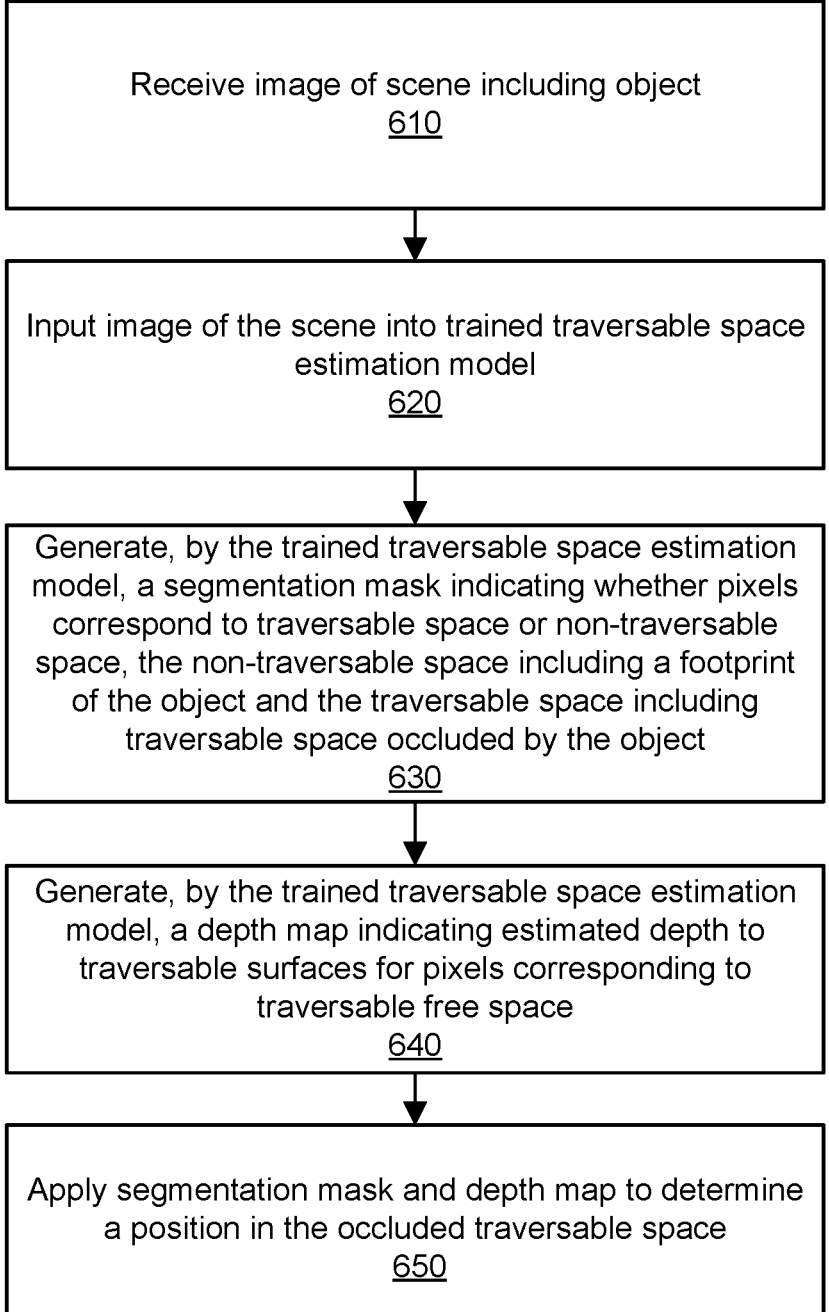

Receive image of scene including object
610

Input image of the scene into trained traversable space
estimation model
620

Generate, by the trained traversable space estimation
model, a segmentation mask indicating whether pixels
correspond to traversable space or non-traversable
space, the non-traversable space including a footprint
of the object and the traversable space including
traversable space occluded by the object
630

Generate, by the trained traversable space estimation
model, a depth map indicating estimated depth to
traversable surfaces for pixels corresponding to
traversable free space
640

Apply segmentation mask and depth map to determine
a position in the occluded traversable space
650

DETERMINING TRAVERSABLE SPACE FROM SINGLE IMAGES

CROSS REFERENCE TO RELATED APPLICATIONS

This application is a continuation of U.S. Non-Provisional application Ser. No. 17/193,878 filed Mar. 5, 2021, which claims the benefit of U.S. Provisional Application No. 62/987,849 filed Mar. 10, 2020, both of which are incorporated by reference in their entirety.

BACKGROUND

1. Technical Field

The subject matter described generally relates machine vision, and in particular to training a machine-learned model to determine traversable space in a scene from a single image.

2. Problem

Depth sensing has applications in both navigation and scene understanding. It is helpful for computerized agents (e.g., a street cleaning robot or an augmented reality character) to know how to explore both the visible and the hidden, unseen world. However, most methods aim to predict the geometry of surfaces that are visible to the camera, which is of limited use when planning paths for robots or augmented reality characters. Generally, the movement of such agents is limited to traversable surfaces, such as grass, footpaths, and pavements. However, many scene analysis algorithms are based on line-of-sight, so do not detect traversable surfaces that are obscured by objects in the scene. For example, while a tree in reality has a relatively small footprint on the ground, it may obscure a large amount of traversable ground behind it in a scene. Existing models that predict beyond the line-of-sight typically parameterize the scene with voxels or meshes, which can be expensive to use in machine learning frameworks.

SUMMARY

A model predicts the geometry of both visible and occluded traversable surfaces from input images. The model may be trained from stereo video sequences, using camera poses, per-frame depth, and semantic segmentation to form training data, which is used to supervise an image to image network. Using the disclosed approaches, there is a surprisingly low bar for spatial coverage of training scenes in order to obtain a model with practical accuracy.

In various embodiments, the model is applied to a single RGB image depicting a scene to produce information describing traversable space of the scene that includes occluded traversable space (e.g., a traversable surface occluded by an object in the scene). The information describing traversable space can include a segmentation mask of pixels representing visible traversable space and visible non-traversable space, a depth map indicating an estimated depth to surfaces represented by each pixel in the image from the camera, a segmentation mask of traversable space (e.g., both visible and occluded) and non-traversable space, and a depth map indicating an estimated depth to traversable surfaces corresponding to each pixel determined to correspond to traversable space. Among other applications, this information may enable an agent to know where it can walk, roll, or otherwise travel beyond the immediately visible surfaces. As well as modelling visible surfaces, the model may also identify regions where moving or static objects preclude traversal. These occupied regions of otherwise traversable surfaces are referred to as footprints.

Many previous approaches rely on bounding box estimates, which are limited to cuboid object predictions. Other approaches to estimating missing geometry require complete, static training environments, which are either small in scale or synthetic in order to be computationally viable. In contrast, the disclosed models can create valuable predictions of hidden surfaces given only partial views of real-world scenes at training time. The models may use a lightweight representation of hidden geometry derivable from a single, color image, which can be trained using video depth data. The models may also be trained from videos based on moving objects or incomplete observations of the scene, through masking of moving objects, a predetermined probability of space being traversable or non-traversable for missing or unknown data, and use of depth to give additional information.

Some previous approaches further use resource intensive computation techniques to predict traversable space at test time, such as voxel-based techniques. Some of these or other previous approaches also do not account for the position of objects in a scene, do not determine traversable space relative to a camera view of an input image, or do not account for object movement. In contrast, the disclosed models can efficiently determine traversable space from a view of an input image that accounts for object footprints and movement at test time.

BRIEF DESCRIPTION OF THE DRAWINGS

FIG. 1 illustrates a networked computing environment, in accordance with one or more embodiments.

FIG. 5 is a flowchart describing a general process of training a traversable space model, in accordance with one or more embodiments.

FIG. 6 is a flowchart describing a general process of using a traversable space model, according to one or more embodiments.

Figure 2:
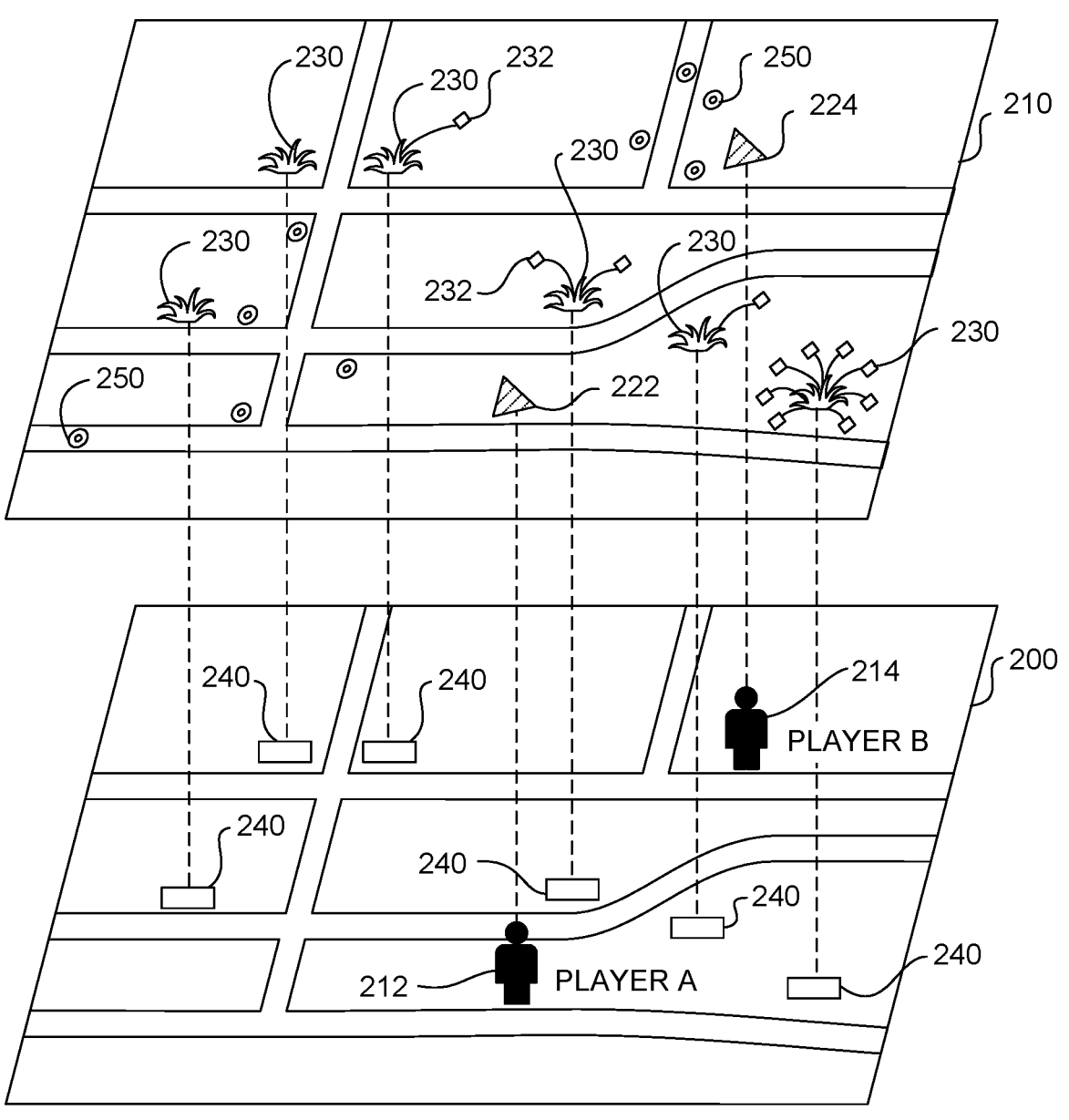
FIG. 2 depicts a representation of a virtual world having a geography that parallels the real world, in accordance with one or more embodiments.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

Exemplary Location-Based Parallel Reality Gaming System

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where determining depth information or traversable space from image data is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

FIG. 1 illustrates a networked computing environment 100, in accordance with one or more embodiments. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, a player who is close enough to a virtual element to interact with it in this manner is referred to as being at the real-world location corresponding the virtual element. In addition, various embodiments are described with reference to "the player's location" but one of skill in the art will appreciate that such references may refer to the location of the player's client device 110.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to or interact with various virtual elements or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player travels to the landmark or geographic location 240 linked to the virtual elements 230 in the real world and interacts with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph or verifying, obtaining, or capturing other information about the landmark or object 240 associated with the virtual element 230. In other embodiments, different or additional mechanisms for capturing virtual elements may be available. For example, an in-game item may enable a player to interact with a virtual element remotely (i.e., from a real-world location other than the location corresponding to the virtual element).

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real-world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of client devices 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is. The client device 110 also includes a traversable space estimation model 130 that is a machine learning model, e.g., trained by the game server 120. In the embodiment shown in FIG. 1, each client device 110 includes additional software components such as a gaming module 135 and a positioning module 140. The client device 110 may include various other input/output devices for receiving information from or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment where the client device 110 is in. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. The camera assembly 125 captures image data and shares the image data with the computing device on the client device 110. The image data can be appended with metadata describing other details of the image data including sensory data (e.g. temperature, brightness of environment) or capture data (e.g. exposure, warmth, shutter speed, focal length, capture time, etc.). The camera assembly 125 can include one or more cameras which can capture image data. In one instance, the camera assembly 125 includes one camera and is configured to capture monocular image data. In another instance, the camera assembly 125 includes two cameras and is configured to capture stereo image data. In various other implementations, the camera assembly 125 includes multiple cameras each configured to capture image data.

The traversable space estimation model 130 receives an input image of a scene captured by a camera and outputs information describing traversable space of the scene based on the input image. As used herein, traversable space refers to a traversable surface in a scene (e.g., the ground). Similarly, non-traversable space refers to a surface in a scene which cannot be traversed. For instance, non-traversable space may be an untraversable surface in an environment (e.g., a person, a wall, an uneven surface, or some other untraversable object), or may be a traversable surface that is overlaid by an object footprint. In an image representing a view of an environment, some traversable space may be visible in the image, which is referred to as visible traversable space. Additionally, or alternatively, some traversable space may be occluded by objects in the environment, which is referred to as occluded traversable space.

In one embodiment, the information output by the traversable space estimation model 130 includes a segmentation mask of the input image segmenting pixels representing visible traversable space and pixels representing visible non-traversable space of the input image, a depth map indicating an estimated depth to a surface represented by each pixel in the input image from the camera, a segmentation mask segmenting pixels corresponding to traversable space (e.g., visible and obscured) and pixels corresponding to non-traversable space, a depth map indicating an estimated depth to a traversable surface for each pixel corresponding to traversable space, or some combination thereof. In other words, the traversable space estimation model 130 is trained to determine information describing where there is traversable space occluded by an object in a scene, and the distance from the camera to the occluded traversable space (e.g., the depth for pixels in the input image corresponding to the occluded traversable space if the object was not blocking the camera's line-of-sight). The traversable space estimation model 130 may also learn the footprints of the obscuring objects. Thus, robots, AR characters, and other agents using the model's output for navigation can plan to pass behind occluding objects through occluded space, but are unlikely to bump into the occluding objects because the model also outputs an estimate of those objects' footprints (i.e., the portion of the otherwise traversable surface that is rendered non-traversable by the objects).

In one embodiment, the traversable space estimation model 130 is trained by a traversable space estimation training system 170 and can be updated or adjusted by the traversable space estimation training system 170, which is discussed in greater detail below. The received input image may be captured by a camera of the camera assembly 125 or another camera from another client device 110. In some embodiments, the received input image has metadata appended to the image specifying intrinsics of the input image. The intrinsics of an image refer to one or more geometric properties of the camera at a time when the image was captured, e.g., the focal length of the camera when capturing the image, the camera's principal point offset, the skew of the camera, etc. With the intrinsics, the traversable space estimation model 130 may generate an intrinsic matrix accounting for the intrinsics. In some embodiments, the traversable space estimation model 130 determines whether the input image is above a threshold resolution. If not, the traversable space estimation model 130 may upsample the input image to a desired resolution prior to determining the information describing traversable space of the scene. The traversable space estimation model 130 inputs the image (as received or after upsampling) and determines information describing traversable space of the scene. Machine learning algorithms may be implemented in the traversable space estimation model 130, for training or inference.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g. renders imagery of the virtual world) associated with the game and allows a user to interact in the virtual world to perform various game objectives. In some other embodiments, the gaming module 135 presents image data from the real world (e.g., captured by the camera assembly 125) augmented with virtual elements from the parallel reality game. In these embodiments, the gaming module 135 may generate virtual content or adjust virtual content according to other information received from other components of the client device. For example, the gaming module 135 may adjust a virtual object to be displayed on the user interface according to a depth map (e.g., determined by the traversable space estimation model 130) of the scene captured in the image data.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate or adjust game content to be displayed by the client device 110. For example, the gaming module 135 may generate a virtual element based on information describing traversable space of a scene (e.g., as determined by the traversable space estimation model 130). For example, the gaming module 135 may determine a path for a virtual element in the scene on the traversable space.

The positioning module 140 can be any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 140 may further include various other sensors that may aid in accurately positioning the client device 110 location.

As the player moves around with the client device 110 in the real world, the positioning module 140 tracks the position of the player and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 110 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual world elements (e.g. location of real-world objects/landmarks, description of real-world objects/landmarks, relevance of virtual elements linked to real-world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g. player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal gaming module 145, a commercial game module 150, a data collection module 155, an event module 160, and a traversable space estimation training system 170. As mentioned above, the game server 120 interacts with a game database 115 that may be part of the game server 120 or accessed remotely (e.g., the game database 115 may be a distributed database accessed via the network 105). In other embodiments, the game server 120 contains different or additional elements. In addition, the functions may be distributed among the elements in a different manner than described. For instance, the game database 115 can be integrated into the game server 120.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve or store game data when hosting the parallel reality game. The universal game module 145 also receives game data from client device 110 (e.g. depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The traversable space estimation training system 170 trains a traversable space estimation model, e.g., the traversable space estimation model 130 provided to the client device 110. The traversable space estimation training system 170 receives image data for use in training the traversable space estimation model. Generally speaking, the traversable space estimation training system 170 processes the image data, inputs the image data into the traversable space estimation model, and iteratively adjusts parameters of the traversable space estimation model. In one embodiment, the traversable space estimation training system 170 generates training data for training the model using stereo video data, which is described in greater detail below with reference to FIG. 4. The traversable space estimation training system 170 may further define an error threshold for the traversable space estimation model which can be used to determine whether the traversable space estimation model is sufficiently accurate in estimating information describing traversable space of scenes. Training by the traversable space estimation training system 170 will be further described below.

Once the traversable space estimation model is trained, the traversable space estimation model receives image data and outputs information describing traversable space of scenes depicted in the image data. The traversable space estimation training system 170 provides the trained model to the client device 110. The client device 110 uses the trained model to estimate traversable space of scenes depicted in images (e.g., captured by a camera on the device). The traversable space estimates may have various uses, such as aiding in the rendering of virtual content that interacts with the real world, assisting navigation of robots, detecting potential hazards for autonomous vehicles, and the like.

The network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
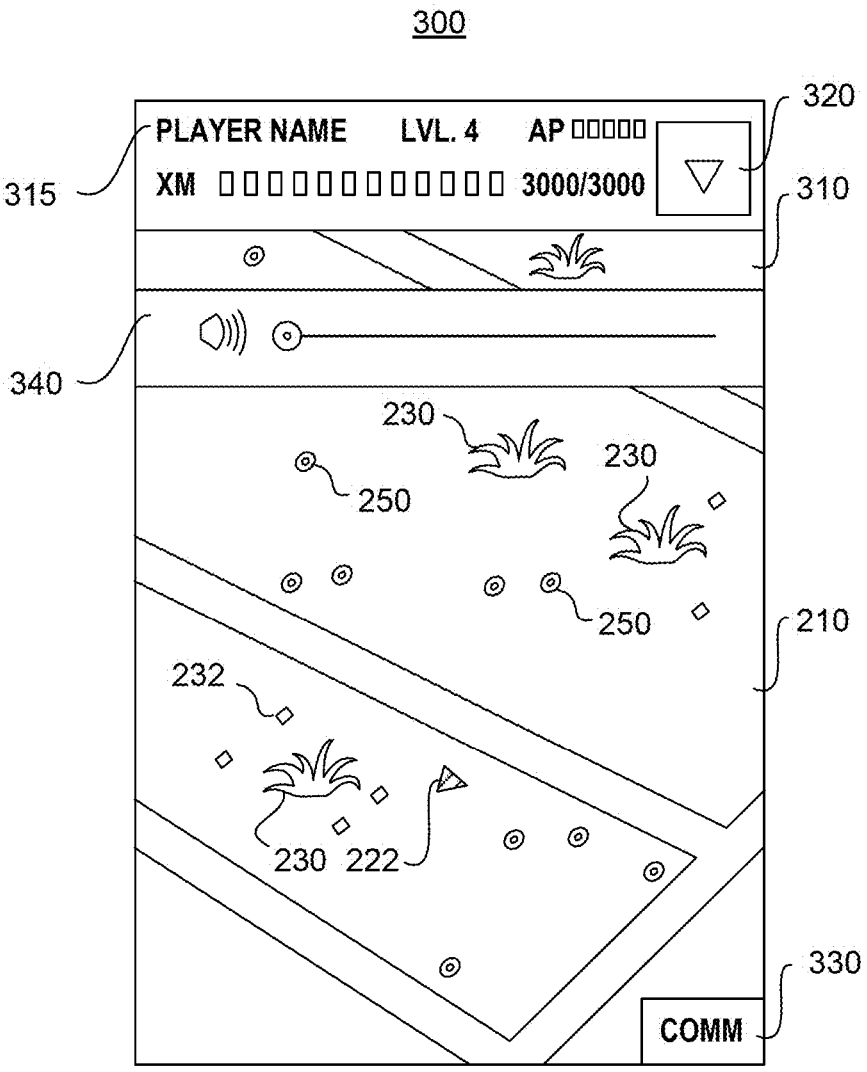
FIG. 3 depicts an exemplary game interface of a parallel reality game, in accordance with one or more embodiments.

FIG. 3 depicts one embodiment of a game interface 300 that can be presented on a display of a client 110 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 110 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Traversable Space Estimation Training

The traversable space estimation training system 170 trains the traversable space estimation model 130. In some embodiments, the traversable space estimation model 130 is trained using stereo video data. The following paragraphs describe a training method 400 in which stereo video data is processed to generate training data to train an image-to-image traversable space estimation model. However, other embodiments use other methods to generate training data or may train models with various other model structures and architectures. For example, the traversable space estimation training system 170 may train models using images labeled by human reviewers, images of a static training environment, synthetic image data, or geometric information describing a scene.

In the embodiment shown in FIG. 1, the traversable space estimation training system 170 includes a stereo vision module 175, a training image synthesis module 180, a training loss module 185, an object footprint estimation module 190, and a movement estimation module 195. In other embodiments, the traversable space estimation training system 170 may include different or additional components, e.g., data stores, feedback modules, smoothing modules etc. For example, a data store may store training data or trained parameters when training one or more models of the stereo vision module 175 or the training image synthesis module 180. In another example, a smoothing module can process depth maps such as smoothing depth values in the depth map.

Figure 4:
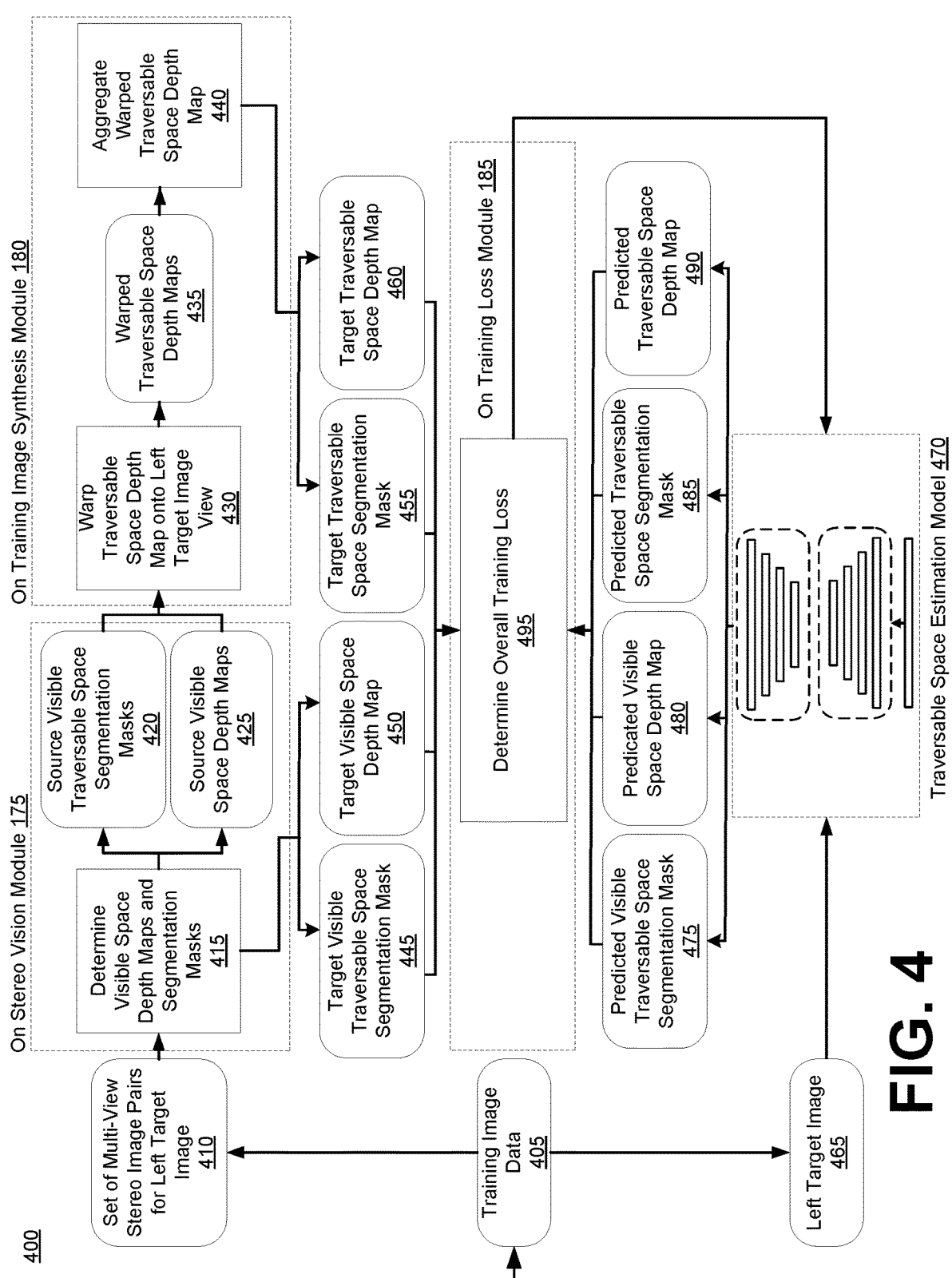
FIG. 4 illustrates a process for generating training data to train a traversable space estimation model, in accordance with one or more embodiments.

FIG. 4 illustrates an embodiment of a process 400 for generating training data to train a traversable space estimation model. In the embodiment shown in FIG. 4, the traversable space estimation training system 170 trains a traversable space estimation model 470 to be able to determine information describing traversable space of a scene depicted by a target image 465. In this embodiment, given the target image 465 as input the traversable space estimation model 470 has four output channels, particularly a predicted visible space segmentation mask 475, a predicted visible traversable space depth map 480, a predicated traversable space segmentation mask 485, and a predicted traversable space depth map 490. In other embodiments, the traversable space estimation model 470 may output a subset of these four output channels (e.g., the segmentation mask 485 and the depth map 490), or may have additional or otherwise different output channels.

In order to train the traversable space estimation model 470, the traversable space estimation training system 170 generates or retrieves a set of training target images (e.g., the left target image 465) with pixels labeled with a target value for each of the output channels of the traversable space estimation model 470. As depicted in FIG. 4, the target values for labeling the pixels of the left target image 465 are the pixels of the target visible space segmentation mask 445, the target visible space depth map 450, the target traversable space segmentation mask 455, and the target traversable space depth map 460.

The traversable space estimation training system 170 may generate the set of labeled training target images from training image data 405. For instance, the training data may include frames of video data captured using a stereo camera. Although the training process is depicted in FIG. 4 is relative to a single left target image 465 of the training image data 405, this is done for the purposes of illustration only and one skilled in the art will appreciate that the training process may be repeated for any number of target images, e.g., included in the training image data 405. Furthermore, although segmentation masks and depth maps are generated from a view of the left images of the training image data 405 as described herein, one skilled in the art will appreciate that similar techniques can be applied to the right images of the training image data 405.

The stereo vision module 175 and the training image synthesis module 180 generate the target values for labeling a target image 465 using a set of multi-view stereo image pairs for the target image 410. The set of multi-view stereo pairs 410 includes a target image stereo pair including the left target image 465 and right target image and a set of source stereo image pairs each including a left source image and a right source image. The set of multi-view stereo pairs 410 depict a scene from multiple views. In particular, the left and right source images of the source stereo image pairs depict the scene from a different view than the left and right target images, respectively. For instance, the source stereo image pairs may be frames coming at some time before or after frames of the target stereo image pair in a video captured using a stereo camera, where the stereo camera moved between capturing the target stereo image pair and the source stereo image pairs.

The stereo vision module 175 determines 415 visible space depth maps and visible traversable space segmentation masks for the left target image 465 and the left source images using the set of multi-view stereo image pairs 410. As an example, the visible space depth maps may include a depth value for all pixels in an input image representing a distance from the camera to a visible surface represented by a pixel. As another example, the visible traversable space segmentation masks may be binary segmentation masks where pixels representing visible traversable space have a value of one and pixels representing visible non-traversable space have a value of zero. In particular, the stereo vision module 175 determines the visible space depth maps and segmentation masks by processing the set of multi-view stereo image pairs 410 using one or more stereo vision models or algorithms. For instance, the stereo vision module 175 may determine visible space depth maps for a left image of a given stereo image pair using geometric stereo matching algorithms (e.g., estimating disparity maps) or stereo matching depth estimation models (e.g., a pyramid stereo matching network). Similarly, the stereo vision module 175 may determine the visible space segmentation masks using various ground segmentation techniques, such as a trained image-to-image ground segmentation model. The traversable space estimation training system 170 uses the target visible traversable space segmentation mask 445 and the target visible space depth map 450 determined for the left target image 465 to label the left target image 465. The stereo vision module 175 provides the segmentation masks and depth maps for the left source images to the training image synthesis module 180 for generating the target traversable space segmentation mask 455 and the target traversable space depth map 460, as described in greater detail below.

The training image synthesis module 180 generates the target traversable space segmentation mask 455 and the target traversable space depth map 460 using the segmentation masks and depth maps for the left source images of the set of multi-view stereo image pairs. In particular, the training image synthesis module 180 calculates intrinsics and extrinsics for the target stereo image pair and the source stereo image pairs in order to determine the relative camera positions of the left target image and the left source images. The intrinsics of an image refer to the geometric properties of the camera used to capture that image, e.g., including the focal length of the camera, the camera's principal point offset, the skew of the camera. In some cases, the intrinsics can be constant for each camera between all images taken or the intrinsics can vary as the camera adjusts its parameters when taking various images. The extrinsics of an image refers to the position and orientation of the camera in three-dimensional space. The training image synthesis module 180 may use various camera calibration or simultaneous localization and mapping (SLAM) technique to calculate the intrinsics and extrinsics for the stereo image pairs, such as ORB-SLAM2.

Using the relative camera positions determined from the extrinsics, the training image synthesis module 180 generates warped traversable space depth maps 435 for each of the source stereo image pairs by warping 430 traversable depth values onto the view of the left target image 465. For instance, the training image synthesis module 180 may forward warp, inverse warp, or otherwise project the pixels representing depth values for visible traversable space in a traversable space depth map 435 onto the left target image 465. The training image synthesis module 180 identifies the traversable depth values from pixels in a source visible space depth maps 425 using a corresponding source visible space segmentation mask 420. Given that the source visible space depth maps represent depth values for the scene from a different view than the left target image 465, a warped traversable space depth map 435 may include depth values for traversable space that is obscured by objects in the left target image 465 but not obscured in the left source image corresponding to the warped traversable space depth map 435. As such, the warped traversable space depth maps provide depth values for pixels in the target image representing traversable space that is not visible in the target image.

The training image synthesis module 180 uses 440 the warped traversable space depth maps 435 in order to generate the target traversable space segmentation mask 455 and the target traversable space depth map 460. In some embodiments, the training image synthesis module 180 aggregates the warped traversable space depth maps 435 in order to aggregate depth values from each of the views represented by the left source stereo images. Such aggregation increases the likelihood that hidden traversable space for the left target image 465 is identified. Additionally, such aggregation reduces inaccuracies in the individual warped traversable depth maps resulting from inaccuracies in the segmentation, depth, or camera position estimation processes described above. The warped traversable depth maps 435 may be aggregated using various methods. In some embodiments, the traversable space segmentation mask 455 is generated by designating pixels from the left target image 465 as traversable if a threshold number of the warped traversable depth maps 435 have a non-zero depth value, and non-traversable otherwise. For instance, the target traversable space segmentation mask 455 may be determined using the following equation:

$$S_{traversable\ space} = \left\{ j \in J \left| \left( \sum_{P_i \in P} [p_j > 0] > k \right) \right\}$$

Where $S_{traversable\ space}$ is the target traversable space segmentation mask 455, j is the set of all pixel indices in the left target image, P is the set of warped traversable space depth maps 435, $P_i$ is the ith warped traversable space depth map, $p_j$ is the jth pixel in $P_i$, [ ] is the Iverson bracket, and k is the threshold number for warped traversable depth maps having a non-zero depth value for $p_j$.

As another example, the target traversable space depth map 460 may be generated by performing one or more statistical operations the depth values of the warped traversable depth maps 435, such as determining an average or median depth value. For instance, the target traversable space depth map 460 may be determined using the following equation:

$$D_{traversable\ space} = \text{median}(\{P_i \in P | P_i > 0\})$$

Where $D_{traversable\ space}$ is the target traversable space depth map 460, P is the set of warped traversable space depth maps 435, and $P_i$ is the ith warped traversable space depth map. In this case, the target traversable space depth map 460 may ignore warped traversable space depth maps with a value of zero for a depth value in determining the median.

The traversable space estimation training system 170 uses the determined target traversable space segmentation mask 455 and target traversable space depth map 460 to label the left target image 465.

The training loss module 185 determines a training loss for the traversable space estimation training system 170. In the embodiment shown in FIG. 4, the training loss module 185 determines 495 an overall training loss by comparing the target visible traversable space segmentation mask 445, target visible space depth map 450, target traversable space segmentation mask 455, and target traversable space depth map 460 to the respective predicted outputs 475, 480, 485, and 490 of the traversable space estimation model 470. The overall training loss may be derived from a combination of multiple training loss values, such as a combination of training loss values for each of the outputs 475, 480, 485, and 490 predicated by the traversable space estimation model 470. For instance, the training loss module 185 may determine a training loss contribution for the predicted traversable space segmentation mask 485 training loss by comparing the target traversable space segmentation mask 455 to the predicted traversable space segmentation mask 485. For instance, the training loss module 185 may determine a contribution to the overall training loss that increases the likelihood that the traversable space estimation model 470 will predict that pixels of the left target image 465 are traversable if they are designated as traversable by the target traversable space segmentation mask 460. Said another way, the overall training loss may encourage the traversable space estimation model 470 to predict that pixels in a target image corresponding to traversable space in a traversable space segmentation mask are traversable. Similarly, the training loss module 185 may determine individual training loss contributions by comparing the target segmentation mask 445 to the predicted segmentation mask 475, by comparing the target depth map 450 to the predicted depth map 480, or by comparing the target depth map 460 to the predicted depth map 490. Example loss functions that can be used to determine these or other training loss contributions include cross-entropy loss, hinge loss, mean absolute error (L1) loss, mean squared error (L2) loss, or some combination thereof.

In some embodiments, the overall training loss function is:

$$L = \sum_{j \in J} l_j^{S\ visible\ space} + l_j^{D\ visible\ space} + l_j^{S\ traversable\ space} + l_j^{D\ traversable\ space}$$

Where L is the overall training loss, j is the set of all pixel indices in the left target image 465, $1_j^{S^{visible\ space}}$ is the loss value for the jth pixel of the predicted visible traversable space segmentation mask 475, $1_j^{D^{visible\ space}}$ is the loss value for the jth pixel of the predicted traversable space depth map, $1_j^{S^{traversable\ space}}$ is the loss value for the jth pixel of the predicted traversable space segmentation mask 485, and $1_j^{D^{traversable\ space}}$ is the loss value for the jth pixel of the predicted traversable space depth map 490.

The traversable space estimation training system 170 uses the overall training loss determined by the training loss module 185 to update parameters of the traversable space estimation model 470 used to determine the predicted model outputs. For instance, the traversable space estimation training system 170 may perform backpropagation using the overall loss value to determine update values (e.g., gradients) for parameters of the traversable space estimation model 470. Furthermore, the traversable space estimation training system 170 may apply the update values to the model parameters using a variety of techniques. For instance, the traversable space estimation training system 170 may use various learning rates or update functions to apply the update values.

The object footprint estimation module 190 determines an object footprint segmentation mask for target images (e.g., the left target image 465) indicating pixels that correspond to object footprints in the target image. As an example, the object footprint segmentation mask may be a binary segmentation mask where pixels corresponding to object footprints have a value of one and pixels that do not correspond to object footprints have a value of zero. The object footprint segmentation mask may identify entire object footprints in a target image or may identify portions of object footprints. For instance, the object footprint estimation model 190 may determine pixels that have a relatively high probability of corresponding to an object footprint, such as pixels representing a portion of an object footprint under a side of an object visible in an image. Among other uses, object footprint segmentation masks can be used to address inaccuracies in traversable space segmentation masks or depth maps determined by the training image synthesis module 180. For instance, as described above, the target traversable space segmentation mask 455 or depth map 460 determined by the training image synthesis module 180 may include inaccurate depth or segmentation values. As such, the segmentation mask 455 or the depth map 460 may indicate that a pixel corresponds to traversable space when the pixel actually corresponds to non-traversable space, such as traversable space overlaid by an object footprint. In order to minimize the impact of such inaccuracies on the training process, the traversable space estimation training system 170 may adjust the segmentation mask 455 or the depth map 460 used to label the left target image 465. For example, the traversable space estimation training system 170 may designate pixels in the segmentation mask 455 as non-traversable if they correspond to pixels designated as an object footprint in the object footprint segmentation mask, regardless of whether the pixels in the segmentation mask 455 were originally designated as traversable or non-traversable.

The object footprint estimation module 190 may determine an object footprint segmentation mask for a target image using a variety of techniques. In one embodiment, the object footprint estimation module 190 projects pixels of the target visible space depth map 450 from camera space to world space. The object footprint estimation module 190 then fits a plane to a first subset of the projected points which are designated as traversable by the target visible traversable space segmentation mask 445, e.g., using a random sample consensus (RANSAC) process. A second subset of the projected points which are designated as non-traversable by the target visible traversable space segmentation mask 445 are then shifted along a normal vector of the plane until they intersect with the plane. Finally, the object footprint estimation module 190 re-projects the points on the plane back into camera space and processes the re-projected points to identify points corresponding to object footprints.

In some embodiments, the training loss module 185 uses an object footprint segmentation mask for a target image in determining an overall training loss for the traversable space estimation model 470. For instance, the training loss module 185 may determine a loss contribution for the target traversable space segmentation mask 455 to the overall training loss that increases the likelihood that the traversable space estimation model 470 will predict that pixels of the left target image 465 are non-traversable if they are designated as corresponding to an object footprint by an object footprint segmentation mask for the left target image 465. Said another way, the overall training loss may encourage the traversable space estimation model to predict that pixels in the target image corresponding to object footprints in an object footprints segmentation mask are non-traversable. Additionally, or alternatively, the training loss module 185 may determine an overall training loss that considers pixels that are not designated as traversable by the target traversable space segmentation mask 455 or designated as corresponding to an object footprint by the object footprint segmentation mask (i.e., "unknown pixels"). For example, the training loss module 185 may determine a contribution for the target traversable segmentation mask 455 to the overall training loss that encourages the traversable space estimation model 470 to predict that pixels of the left target image 465 are non-traversable if they are unknown pixels. In these cases, the training loss module 185 may determine a loss contribution for unknown pixels that uses a predetermined prior probability value (i.e., a "prior") that encourages the traversable space estimation model 470 to predict that unknown pixels are non-traversable.

The movement estimation module 195 estimates which pixels in target images (e.g., the left target image 465) represent visible moving objects in order to generate a moving object segmentation mask for the target images. In particular, the moving object segmentation mask indicates whether pixels represent visible moving objects or represent visible static objects. As an example, the moving object segmentation mask may be a binary segmentation mask where pixels representing static objects have a value of one and pixels representing moving objects have a value of zero. In some embodiments, the training loss module 185 uses a moving object segmentation mask for a target image to remove or otherwise ignore loss contributions to the overall training loss from pixels corresponding to moving objects for the predicted traversable space segmentation mask 485. The movement estimation module 195 may use various techniques to identify pixels associated with moving objects in the left target image 465, such as object detection, semantic segmentation, image processing techniques, or some combination thereof. In some embodiments, the movement estimation module 195 estimates induced flow and optical flow between pixels of the left target image 465 and corresponding pixels of an adjacent left source image (e.g., the prior or subsequent frame in a video). The movement estimation module 195 designates pixels where the induced flow and the optical flow differ by a threshold amount as moving objects.

In one embodiment, the loss values determined for the predicted traversable space segmentation mask 485 are determined using the object footprint segmentation mask and the moving object segmentation mask with the following loss function:

$$l_j^{S^{traversable\ space}} = \begin{cases} -u_j \log(\hat{s}_j^{traversable\ space}) & \text{if } j \in S^{traversable\ space} \\ -u_j \log(1 - \hat{s}_j^{traversable\ space}) & \text{if } j \in S^{object\ footprint} \\ -\gamma \log(1 - \hat{s}_j^{traversable\ space}) & \text{otherwise} \end{cases}$$

Where $l_j^{S^{traversable\ space}}$ is loss value for the jth pixel of the predicted traversable space segmentation mask 485, $u_j$ is the jth pixel of the moving object segmentation mask, $\hat{s}_j^{traversable\ space}$ is the jth pixel of the predicted traversable space segmentation mask 485, $S^{traversable\ space}$ is the target traversable space segmentation mask 455, $S^{object\ footprint}$ is the object footprint segmentation mask, and $\gamma$ is a prior where $\gamma < 1$.

In the same or different embodiment, the following loss functions are used to determine loss values for the other outputs of the traversable space estimation model 470:

$$l_j^{S^{visible\ space}} = \text{binary\_cross\_entropy}(\hat{s}_j^{visible\ space}, s_j^{visible\ space})$$

$$l_j^{D^{visible\ space}} = \log\left(\left|d_j^{visible\ space} - \hat{d}_j^{visible\ space}\right| + 1\right)$$

$$l_j^{D^{traversable\ space}} = \log\left(\left|d_j^{traversable\ space} - \hat{d}_j^{traversable\ space}\right| + 1\right),$$

$$j \in S^{traversable\ space}$$

Where $l_j^{S^{visible\ space}}$ is the loss value for the jth pixel of the predicted visible traversable space segmentation mask 475, $l_j^{D^{visible\ space}}$ is the loss value for the jth pixel of the predicted traversable space depth map, $l_j^{D^{traversable\ space}}$ is the loss value for the jth pixel of the predicted traversable space depth map 490, binary_cross_entropy is the binary cross entropy loss function, $\hat{s}_j^{visible\ space}$ is the jth pixel of the predicted visible traversable space segmentation mask 475, $s_j^{visible\ space}$ is the jth pixel of the target visible traversable space segmentation mask 445, $\hat{d}_j^{visible\ space}$ is the jth pixel of the predicted visible space depth map 480, $d_j^{visible\ space}$ the jth pixel of the target visible space depth map 450, $\hat{d}_j^{traversable\ space}$ is the jth pixel of the predicted traversable space depth map 490, and $d_j^{traversable\ space}$ is the jth pixel of the target traversable space depth map 460.

After training a traversable space estimation module, the traversable space estimation training system 170 can provide parameters for the traversable space estimation module to receive a color input image and generate one or more outputs (e.g., the outputs 475, 480, 485, or 490) based on the parameters trained by the traversable space estimation training system 170. Although the traversable space estimation training system 170 is shown as part of the game server 120 for convenience, some or all of the functions of the traversable space estimation training system 170 described above may be performed by other computing devices and provided to client devices 110 in various ways, including being part of the operating system, included in a gaming application, or accessed in the cloud on demand. Furthermore, although FIG. 4 depicts both the process for generating labeled training data and for applying the labeled training data to train a traversable space estimation model, these processes are depicted together for the purposes of illustration only and one skilled in the art will appreciate that some or all of the various steps involved in these process can be performed at different times or in parallel.

FIG. 5 is a flowchart describing a general process 500 of training a traversable space estimation model, in accordance with one or more embodiments. The process 500 results in a plurality of parameters with which the traversable space estimation model can generate a segmentation mask and a depth map for traversable space given an input image.

The process 500 begins with the traversable space estimation training system 170 acquiring 510 training image data comprising a combination of a target stereo image pair and one or more source stereo image pairs. The target stereo image pair includes a left and right target image representing left and right target views of a scene, respectively. The one or more source stereo image pairs each include a left and right source image representing left and right source views of the scene that are different from the left and right target views. As an example scenario, the scene may include an object which occludes traversable space from one or both of the left or right target views. In this case, the traversable space occluded from the target views may be visible from one or more of the source views. The training image data can be received from a camera on an external device, e.g., the camera assembly 125 on the client device 110. In one embodiment, the network interface 160 receives the training image data. The traversable space estimation training system 170 can store the training image data in various data stores, e.g., in a stereo image data store.

The traversable space estimation training system 170 generates 520 a visible traversable space depth map for a source image of each of the source stereo image pairs (e.g., the left source image). The visible traversable space depth map indicates a distance to visible traversable surfaces represented by pixels of the source image. For instance, as described above, the stereo vision module 175 may determine the visible traversable space depth map for the source images by generating a source visible space depth map and a source visible traversable space segmentation map for the source images. Continuing with the example scenario described above with reference to 510, the visible traversable space depth map for a source image from a source view in which the occluded traversable space is visible includes a pixel with a first depth value representing a depth to the occluded traversable space from the source view.

Using the visible traversable space depth maps for the source images, the traversable space estimation training system 170 generates 530 a warped traversable space depth map for each source image by warping the traversable space depth maps onto a target image of the target stereo image pair (e.g., the left target image). For instance, as described above, the training image synthesis module 180 may forward warp each of the traversable space depth maps onto the target view of the target image. Continuing with the example scenario described above with reference to 520, the warped traversable space depth map for the source image from the source view in which the occluded traversable space is visible includes a pixel with a second depth value representing a depth to the occluded traversable space from the target view.

The traversable space estimation training system 170 generates 540 a target segmentation mask indicating whether pixels of the target image correspond to traversable or non-traversable space using one or more of the warped traversable space depth maps. The traversable space estimation training system 170 further generates 550 a target depth map indicating a distance to a traversable surface for pixels corresponding to traversable space in the target image using one or more of the warped traversable space depth maps. For instance, as described above, the training image synthesis module 180 may determine the target segmentation mask and the target depth map using various techniques to aggregate the warped traversable space depth maps. Continuing with the example scenario described above with reference to step 530, the target segmentation mask designates a pixel in the target image corresponding to the occluded traversable space as traversable space determined using the second depth value. Furthermore, the target depth map includes a pixel with a third depth value representing a depth to the occluded traversable space from the target view. For example, the third depth value may be an average depth value for the relevant pixel across the warped traversable space depth maps.

The traversable space estimation training system 170 trains 560 a traversable space estimation model using the target image, the target depth map, and the target segmentation mask. For example, the traversable space estimation training system 170 may generate a training data set including the target image labeled with the target depth map and the target segmentation mask. In this case, the traversable space estimation training system 170 trains the traversable space estimation model to output a predicted traversable space segmentation mask and a predicted traversable space depth map for a given target image in the training data set. During training, the traversable space estimation training system 170 may compare a predicted segmentation mask and depth map for a target image to the target segmentation mask and depth map. For instance, the target and predicted values may be compared using one or more loss functions, as described above with reference to the training loss module 185. Based on the comparison, the traversable space estimation training system 170 updates parameters of the traversable space estimation model.

In some embodiments, the traversable space estimation training system 170 may determine only one of the target segmentation mask or the target depth map. For instance, if the traversable space estimation training system 170 trains the traversable space estimation model to predict only one of a traversable space depth map or a traversable space segmentation map. In other embodiments, the traversable space estimation training system 170 determines additional target outputs for training the traversable space estimation model, such as a target visible traversable space segmentation mask or a target visible space depth map, as described above with reference to FIG. 4.

Traversable Space Estimation Model

FIG. 6 is a flowchart describing a general process 600 of using a traversable space estimation model, in accordance with one or more embodiments. The process 600 results in a predicted traversable space segmentation mask and a predicted traversable space depth map given an input image. The process 600 may be accomplished by a client device having a trained traversable space estimation model (e.g., the client device 110). The client device can be a generic computing device and may have a camera as well. In some embodiments, the client device is implemented in the parallel reality game described in FIGS. 1-3 above. Although the following description is within the context of a client device, the process 600 may be performed on other computing devices.

The process 600 includes the client device receiving 610 an image of a scene including an object. The image of the scene may be captured by a camera that is a component of the client device or external to the client device. In the context of the parallel reality game, the scene may be a real-world location that may map to virtual locations in the virtual world. The image of the scene may also have intrinsics corresponding to the geometric properties of the camera that captured the image. The image may be a single image captured by the camera. Alternatively, the image may be a frame from video being captured by the camera.

The process 600 includes the client device inputting 620 the image of the scene into a trained traversable space estimation model. The traversable space estimation model may be trained by the traversable space estimation system 170, e.g., via the process 500 of FIG. 5.

The process 600 includes the client device generating 630, by the trained traversable space estimation model, a segmentation mask of the scene where each pixel of the segmentation mask has a value indicating whether the pixel corresponds to traversable space or non-traversable space. For instance, the value for a pixel may be one if the pixel corresponds to traversable space, and zero otherwise. The non-traversable space includes a footprint of the object in the scene. The traversable space includes traversable space occluded by the object in the input image.

The process 600 includes the client device generating 640, by the trained traversable space estimation model, a depth map of the scene corresponding to the image of the scene. Each pixel of the depth map has an estimated depth value describing a relative distance to a traversable surface for the pixels in the image of the scene corresponding to traversable space. For instance, the depth map may include a depth value corresponding to each pixel of the segmentation mask representing traversable space. The depth values may describe a relative distance to visible traversable surfaces in the scene (e.g., depicted in the input image), or may describe a relative distance to an occluded traversable surface in the scene (e.g., occluded by the object in the input image).

The process 600 includes the client device applying 650 the segmentation mask and depth map to determine a position in the occluded traversable space. For example, the client device may determine a path for an agent to navigate through scene that includes the position in the occluded traversable space. In this case, the agent may be a physical agent (e.g., a robot) or a virtual agent (AR objects). As another example, the client device may use the position to generate various virtual content for the scene. The virtual content can be sourced from content for the parallel reality game, e.g., stored in the game database 115. The virtual content may be augmented reality content that can be augmented onto the image of the scene. For example, a virtual character or object is generated that can be positioned at the position in the occluded space or can move about the scene with understanding of the traversable space and object footprints of the scene. For instance, the virtual content may become occluded on one image of the scene as it moves into the traversable space occluded by the object. Similarly, the virtual content may become visible on another image of the scene as it moves out from behind the object onto visible traversable. As an example of a parallel-reality game scenario, a virtual character can duck back and forth from behind a tree where a portion of the virtual character is occluded by the tree when that portion is behind the tree.

Following the example above, the parallel reality game might provide interacting with the virtual character as an objective. In order to interact with the virtual character, a user of the mobile device may need to move their mobile device around while keeping the virtual character in a field of view of the camera. As the user moves the mobile device around, the mobile device can continually capture video or image data which can be used to iteratively generate traversable space information of the scene as the scene is changing with the user's movement of the mobile device. The mobile device can update the video feed on the display while also updating the virtual character based on generated traversable space information so that the user would perceive the virtual character as always interacting appropriately within the scene, e.g., not walking through objects, not having portions that are cut off without any object occluding those portions, etc.

Example Computing System

Figure 7:
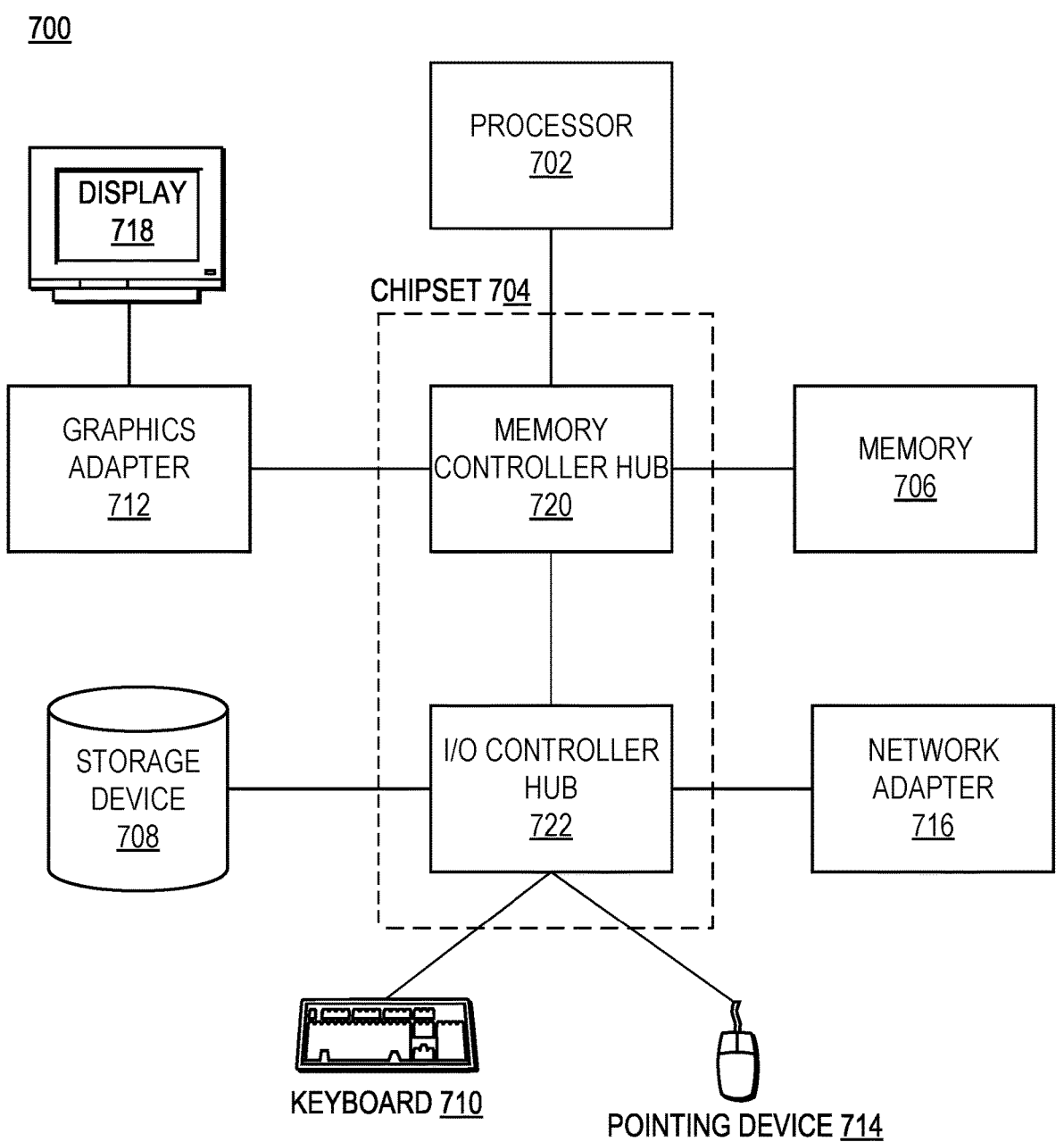
FIG. 7 illustrates an example computer system suitable for use in training or applying a traversable space model, according to one or more embodiments.

FIG. 7 is an example architecture of a computing device, according to an embodiment. Although FIG. 7 depicts a high-level block diagram illustrating physical components of a computer used as part or all of one or more entities described herein, in accordance with an embodiment, a computer may have additional, less, or variations of the components provided in FIG. 7. Although FIG. 7 depicts a computer 700, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 7 are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O hub 722. In another embodiment, the memory 706 is coupled directly to the processor 702 instead of the chipset 704. In some embodiments, the computer 700 includes one or more communication buses for interconnecting these components. The one or more communication buses optionally include circuitry (sometimes called a chipset) that interconnects and controls communications between system components.

The storage device 708 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 708 can also be referred to as persistent memory. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

The memory 706 holds instructions and data used by the processor 702. The memory 706 can be non-persistent memory, examples of which include high-speed random access memory, such as DRAM, SRAM, DDR RAM, ROM, EEPROM, flash memory.

As is known in the art, a computer 700 can have different or other components than those shown in FIG. 7. In addition, the computer 700 can lack certain illustrated components. In one embodiment, a computer 700 acting as a server may lack a keyboard 710, pointing device 714, graphics adapter 712, or display 718. Moreover, the storage device 708 can be local or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 708, loaded into the memory 706, and executed by the processor 302.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by any claims that issue.

What is claimed is:

1. A non-transitory computer-readable storage medium storing instructions that, when executed by a computing device, cause the computing device to perform operations comprising:

receiving an image comprising a plurality of pixels, the plurality of pixels comprising information representing an object in a scene and depth information for the scene;

inputting the image into a traversability model configured to identify traversable and non-traversable space in the scene, the traversability model configured to:

identify a traversable surface in the scene based on the depth information represented by the plurality of pixels in the image, the traversable surface comprising traversable space and non-traversable space, identify pixels in the image representing the object as object pixels, the object pixels comprising a subset of object pixels representing a footprint of the object on the traversable surface, and determine non-traversable space and traversable space on the traversable surface based on the depth information for the object pixels, the non-traversable space including space represented by the subset of object pixels representing the footprint of the object on the traversable surface;

determining a traversable path through the scene for a virtual agent based on the determined non-traversable space and traversable space; and displaying the virtual agent as traversing along the traversable path.

2. The non-transitory computer-readable storage medium of claim 1, wherein the traversability model is further configured to:

determine, based on the object pixels, the object is occluding space in the scene; and determine, based on the depth information for the object pixels, the traversable space includes the space determined to be occluded by the object in the image.

3. The non-transitory computer-readable storage medium of claim 2, wherein the determined traversable path includes traversable space occluded by the object.

4. The non-transitory computer-readable storage medium of claim 1, wherein identifying the traversable surface in the scene based on depth information further comprises:

generating a depth map for the scene based on the depth information for the plurality of pixels;

determining traversable space in the scene based on the depth map and the footprint of the object; and generating the traversable surface based on the depth information for the determined traversable space in the scene.

5. The non-transitory computer-readable storage medium of claim 1, wherein identifying the traversable surface in the scene based on depth information further comprises:

identifying pixels in the image representing a static object, the static object comprising a surface; and determining the traversable surface is the surface of the static object.

6. The non-transitory computer-readable storage medium of claim 1, wherein the object pixels comprise an additional subset of object pixels positioned above a plane of the traversable surface, and the traversability model is configured to:

generate the footprint of the object on the traversable surface by projecting the additional subset of object pixels above the plane of the traversable surface onto the plane of the traversable surface.

7. The non-transitory computer-readable storage medium of claim 1, wherein the traversability model is configured to identify a type of the object and the footprint of the object on the traversable surface is based on the type of the object.

8. A system comprising:

a computing device; and a non-transitory computer-readable storage medium storing computer instructions that, when executed by the computing device, cause the computing device to perform operations comprising:

receiving an image comprising a plurality of pixels, the plurality of pixels comprising information representing an object in a scene and depth information for the scene;

inputting the image into a traversability model configured to identify traversable and non-traversable space in the scene, the traversability model configured to:

identify a traversable surface in the scene based on the depth information represented by the plurality of pixels in the image, the traversable surface comprising traversable space and non-traversable space, identify pixels in the image representing the object as object pixels, the object pixels comprising a subset of object pixels representing a footprint of the object on the traversable surface, and determine non-traversable space and traversable space on the traversable surface based on the depth information for the object pixels, the non-traversable space including space represented by the subset of object pixels representing the footprint of the object on the traversable surface;

determining a traversable path through the scene for a virtual agent based on the determined non-traversable space and traversable space; and displaying the virtual agent as traversing along the traversable path.

9. The system of claim 8, wherein the traversability model is further configured to:

determine, based on the object pixels, the object is occluding space in the scene; and determine, based on the depth information for the object pixels, the traversable space includes the space determined to be occluded by the object in the image.

10. The system of claim 9, wherein the determined traversable path includes traversable space occluded by the object.

11. The system of claim 8, wherein identifying the traversable surface in the scene based on depth information further comprises:

generating a depth map for the scene based on the depth information for the plurality of pixels;

determining traversable space in the scene based on the depth map and the footprint of the object; and generating the traversable surface based on the depth information for the determined traversable space in the scene.

12. The system of claim 8, wherein identifying the traversable surface in the scene based on depth information further comprises:

identifying pixels in the image representing a static object, the static object comprising a surface; and determining the traversable surface is the surface of the static object.

13. The system of claim 8, wherein the object pixels comprise an additional subset of object pixels positioned above a plane of the traversable surface, and the traversability model is configured to:

generate the footprint of the object on the traversable surface by projecting the additional subset of object pixels above the plane of the traversable surface onto the plane of the traversable surface.

14. The system of claim 8, wherein the traversability model is configured to identify a type of the object and the footprint of the object on the traversable surface is based on the type of the object.

15. A method comprising:

receiving an image comprising a plurality of pixels, the plurality of pixels comprising information representing an object in a scene and depth information for the scene;

inputting the image into a traversability model configured to identify traversable and non-traversable space in the scene, the traversability model configured to:

identify a traversable surface in the scene based on the depth information represented by the plurality of pixels in the image, the traversable surface comprising traversable space and non-traversable space, identify pixels in the image representing the object as object pixels, the object pixels comprising a subset of object pixels representing a footprint of the object on the traversable surface, and determine non-traversable space and traversable space on the traversable surface based on the depth information for the object pixels, the non-traversable space including space represented by the subset of object pixels representing the footprint of the object on the traversable surface;

determining a traversable path through the scene for a virtual agent based on the determined non-traversable space and traversable space; and displaying the virtual agent as traversing along the traversable path.

16. The method of claim 15, wherein the traversability model is further configured to:

determine, based on the object pixels, the object is occluding space in the scene; and determine, based on the depth information for the object pixels, the traversable space includes the space determined to be occluded by the object in the image.

17. The method of claim 16, wherein the determined traversable path includes traversable space occluded by the object.

18. The method of claim 15, wherein identifying the traversable surface in the scene based on depth information further comprises:

generating a depth map for the scene based on the depth information for the plurality of pixels;

determining traversable space in the scene based on the depth map and the footprint of the object; and generating the traversable surface based on the depth information for the determined traversable space in the scene.

19. The method of claim 15, wherein identifying the traversable surface in the scene based on depth information further comprises:

identifying pixels in the image representing a static object, the static object comprising a surface; and determining the traversable surface is the surface of the static object.

20. The method of claim 15, wherein the object pixels comprise an additional subset of object pixels positioned above a plane of the traversable surface, and the traversability model is configured to:

generate the footprint of the object on the traversable surface by projecting the additional subset of object pixels above the plane of the traversable surface onto the plane of the traversable surface.

21. The method of claim 15, wherein the traversability model is configured to identify a type of the object and the footprint of the object on the traversable surface is based on the type of the object.

* * * * *